(12) United States Patent
Mannen et al.

(10) Patent No.: US 8,402,210 B2
(45) Date of Patent: Mar. 19, 2013

(54) DISK ARRAY SYSTEM

(75) Inventors: Akihiro Mannen, Yokohama (JP);
Yoichi Mizuno, Yokohama (JP);
Masahiro Arai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 12/422,538

(22) Filed: Apr. 13, 2009

(65) Prior Publication Data

US 2009/0198888 A1 Aug. 6, 2009

Related U.S. Application Data

(63) Continuation of application No. 11/046,826, filed on Feb. 1, 2005, now abandoned.

(30) Foreign Application Priority Data

Nov. 11, 2004 (JP) .................................. 2004-327764

(51) Int. Cl.
*G06F 13/12* (2006.01)
(52) U.S. Cl. ................. 711/113; 711/114; 711/E12.001
(58) Field of Classification Search .................. 711/113, 711/114
See application file for complete search history.

(56) References Cited

U.S. PATENT DOCUMENTS

| | | | |
|---|---|---|---|
| 5,732,405 A | * | 3/1998 | Ho et al. ........................... 711/3 |
| 6,553,511 B1 | | 4/2003 | DeKoning et al. |
| 6,646,948 B1 | | 11/2003 | Stence et al. |
| 6,671,777 B1 | | 12/2003 | Krehbiel et al. |
| 6,880,060 B2 | | 4/2005 | Talagala et al. |

FOREIGN PATENT DOCUMENTS

| | | | |
|---|---|---|---|
| JP | 2000-347815 | * | 7/1999 |
| JP | 2000-347815 | | 12/2000 |
| JP | 2001-202295 | | 7/2001 |

OTHER PUBLICATIONS

Patterson et al "A Case for Redundant Arrays of Inexpensive Disks(RAID)" 1988, ACM, pp. 1-8.*

* cited by examiner

*Primary Examiner* — Kenneth Lo
(74) *Attorney, Agent, or Firm* — Antonelli, Terry, Stout & Kraus, LLP.

(57) ABSTRACT

Provided is a disk array system which is connected to a computer and which data is transmitted by the computer, including: a plurality of disk drives for storing user data transmitted by the computer; a cache memory for temporarily storing data sent/received among the computer and the plurality of disk drives; and a control unit for controlling input/output of the data to/from the cache memory, in which the control unit stores user data identification information that is capable of judging whether the user data is stored in a sector of the disk drive. The disk array system according to this invention allows the identification of user data of a disk drive.

11 Claims, 13 Drawing Sheets

DISK ARRAY SYSTEM

CONTINUING DATA INFORMATION

This is a continuation application of U.S. application Ser. No. 11/046,826, filed Feb. 1, 2005 now abandoned, the content of which are hereby incorporated by reference into this application.

CLAIM OF PRIORITY

The present application claims priority from Japanese application P2004-327764 filed on Nov. 11, 2004, the content of which is hereby incorporated by reference into this application.

BACKGROUND OF THE INVENTION

This invention relates to a disk array system using RAID, and more particularly to a disk array system which is capable of identifying user data of a disk device.

A general disk array system includes a plurality of disk devices, which form a RAID structure. For example, in RAID 5, a given piece of data is divided to be written to a plurality of disk devices simultaneously. In other words, data is previously divided into pieces each having a predetermined size (stripe size), and the divided pieces of data are written to sectors of disk devices. Written to one of the plurality of disk devices is a parity (redundant data) of the data that has been written to another disk device.

Accordingly, in the disk array system, redundant data is created and stored in the disk device so as to allow data to be restored even when a failure occurs in the disk device. Another system is known, in which a guarantee code is appended to each logical data block in order to enhance the reliability of the entire disk array. Specific examples include, as noted in JP 2001-202295 A and JP 2000-347815 A, a method in which, when data is written to a disk device, the guarantee code composed of a logical address value LA (Logical Address) and an exclusive-OR LRC (Longitudinal Redundancy Check) is appended to the data on a logical data block basis, and the resultant data is written to the disk device, and when the data is read out from the disk device, the LA value and LRC value that are appended to each logical data block are checked, thereby checking whether or not an address error or a data error has occurred within the disk device.

SUMMARY OF THE INVENTION

As described above, in the disk array system, data is written to a designated block address of a disk device when a write request is received from a client. However, it depends on a file system what kind of contents the data has. Therefore, it is impossible for the disk array system to identify the written contents.

For example, in the case where the data of a disk device A is copied to another disk device B, it is impossible for the disk array system to identify what kind of data is recorded in the disk device A. Therefore, irrespective of the contents of the disk device A, all sectors thereof need be copied to the disk device B. Accordingly, as the disk capacity increases, the time required for the copy increases correspondingly.

This invention has been made in view of the above-mentioned problem, and has an object to provide a disk array system which is capable of identifying user data of a disk device According to this invention, there is provided a disk array system which is connected to a computer and which data is transmitted by the computer, including: a plurality of disk devices for storing user data transmitted by the computer; a cache memory for temporarily storing data transmitted among the computer and the plurality of disk devices; and a control unit for controlling input/output of the data to/from the cache memory, in which the control unit stores user data identification information that is capable of judging whether or not the user data is stored in a sector of the disk device.

According to this invention, the guarantee code is appended to each of a plurality of pieces of data received from a computer, and a user data identification bit is appended to each of the plurality of pieces of data. Thus, it can be identified whether or not the data stored in at least one of the cache memory and the plurality of disk devices is user data. Consequently, it is possible to reduce the time required for the copy performed between the disk devices, and further reduce the time for disk recovery upon a disk device failure.

DETAILED DESCRIPTION OF THE PREFERRED EMBODIMENTS

Embodiments of this invention will be described below with reference to the drawings.

Figure 1:
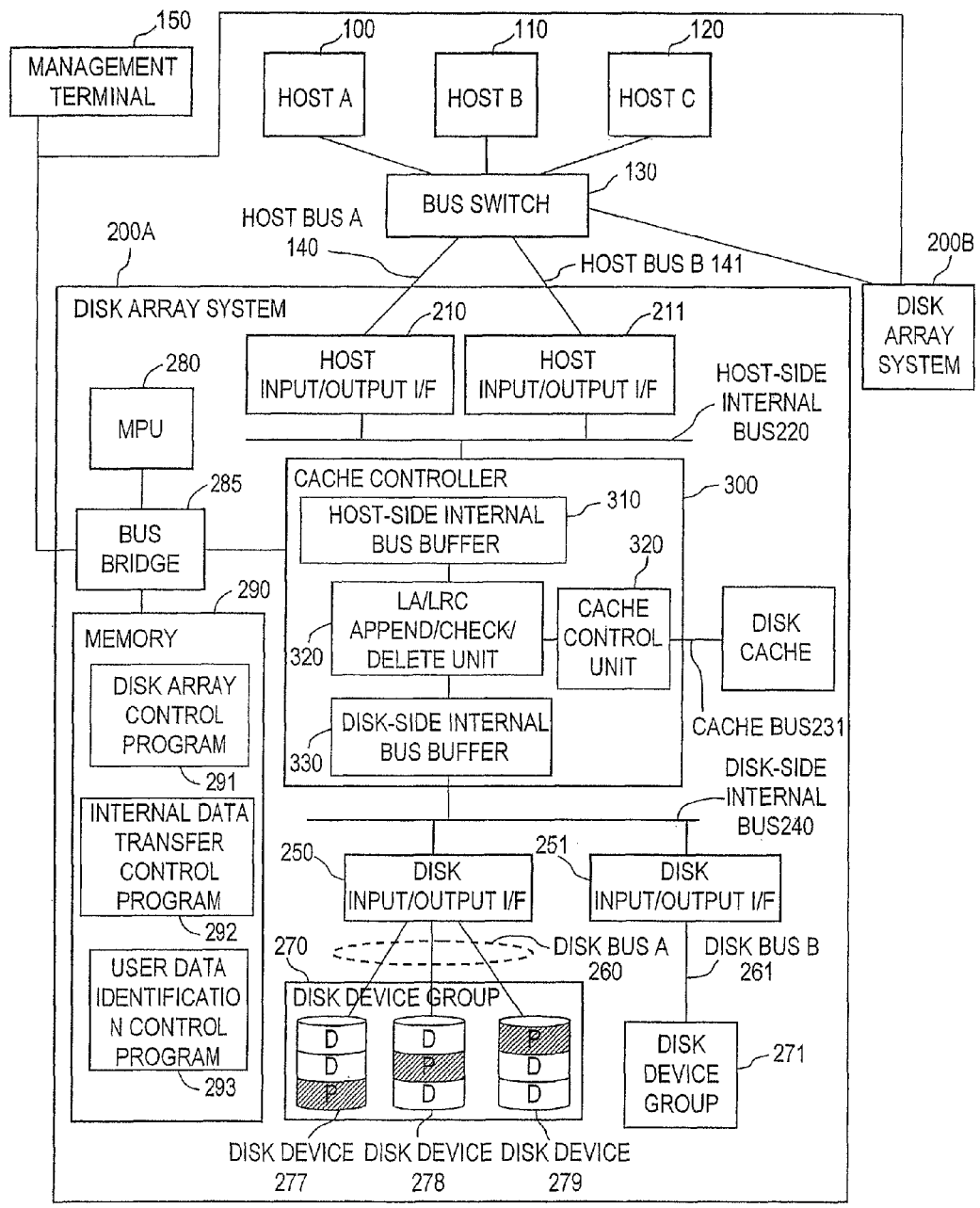
FIG. 1 is a block diagram showing a system structure of a disk array system according to a first embodiment of this invention.

FIG. 1 is a block diagram showing a system structure of a disk array system according to a first embodiment of this invention.

A host computer A 100, a host computer B 110, and a host computer C 120 are devices for inputting/outputting data by sending a read/write request to/from a disk array system 200. In the disk array system of this embodiment, one or a plurality of hosts and the disk array system 200 are connected through a bus switch 130. In this embodiment, a plurality of disk array systems (200A and 200B) are connected through a bus switch 130.

The disk array system 200 includes host input/output I/Fs 210 and 211, a disk cache 230, disk input/output I/Fs 250 and 251, disk device groups 270 and 271, a controller (MPU) 280, a bus bridge 285, a memory 290, and a cache controller 300. Each of the disk device groups 270 and 271 has a plurality of disk devices. The controller 280 includes a microprocessor (MPU) and controls the operation of the entire disk array.

In this embodiment, as an example, the disk device group 270 has three disk devices 277 to 279, which compose RAID 5. Any two of the three disk devices 277 to 279 store data (D), and the other one stores a parity (P) of the data stored in the two disk devices.

It should be noted that the two host input/output I/Fs 210 and 211 are provided to this embodiment, but it is sufficient that at least one or more host input/output I/Fs are provided. Also, the two disk input/output I/Fs 250 and 251 are provided to this embodiment, but it is sufficient that at least one or more disk input/output I/Fs are provided. Further, the two disk device groups 270 and 271 are provided to this embodiment, but it is sufficient that at least one or more disk device groups are provided.

It should be noted that the controller 280 executes a disk array control program 291, thereby controlling the host input/output I/F 210, the cache controller 300, the MPU 280, the bus bridge 285, the memory 290, the disk cache 230, and the disk input/output I/F 250 to function as a RAID controller (disk controller).

The host computer A 100, the host computer B 110, and the host computer C 120 are connected through the bus switch 130 and one of a host bus (host communication path) A 140 and a host bus (host communication path) B 141 to the host input/output I/Fs 210 and 211 of the disk array system 200. FIG. 1 shows the example in which the three host computers are connected to the disk array system 200, but it is sufficient that at least one or more host computers are connected to the disk array system 200.

The host input/output I/Fs 210 and 211 receive input/output requests from the host computer A 100, the host computer B 110, and the host computer C 120, and execute data transfer between those host computers and the cache controller 300. These host input/output I/Fs 210 and 211 are connected through a host-side internal bus (host-side internal communication path) 220 to the cache controller 300.

The disk input/output I/Fs 250 and 251 transfer data between the disk device groups 270 and 271 and the cache controller 300. The disk input/output I/Fs 250 and 251 are connected through disk buses (disk communication paths) A 260 and B 261 to the disk device groups 270 and 271, respectively, and further connected through a disk-side internal bus (disk-side internal communication path) 240 to the cache controller 300.

The disk cache 230 is connected through a cache bus (cache communication path) 231 to the cache controller 300. The disk cache 230 temporarily stores data transferred between the host input/output I/Fs 210 and 211, and the disk input/output I/Fs 250 and 251.

The cache controller 300 has a host-side internal bus buffer 310, a cache control unit 320, and a disk-side internal bus buffer 330. The host-side internal bus buffer 310 temporarily stores data transferred between the host input/output I/Fs 210 and 211 and the disk cache 230. The cache control unit 320 controls operations for reading and writing the data from and to the disk cache 230. The disk-side internal bus buffer 330 temporarily stores data transferred between the disk input/output I/Fs 250 and 251 and the disk cache 230.

Also, the cache controller 300 has an LA/LRC append/check/delete unit 340. This LA/LRC append/check/delete unit 340 appends LA and LRC, which will be described later, to data transferred from the host input/output I/Fs 210 and 211 to the disk cache 230. Further, the LA/LRC append/check/delete unit 340 checks and deletes the LA and LRC which are appended to the data transferred from the disk cache 230 to the host input/output I/Fs 210 and 211.

The controller 280 is connected through the bus bridge 285 to the memory 290 and the cache controller 300.

The controller 280 controls the processing of the entire disk array based on the disk array control program 291. Also, the controller 280 instructs the cache controller 300 to set the LA/LRC based on an internal data transfer control program 292. Further, the controller 280 issues a data transfer instruction to the host input/output I/Fs 210 and 211 and the disk input/output I/Fs 250 and 251.

The MPU 280 identifies the user data of each sector of the data to the disk device groups 270 and 271, as described later, based on a user data identification control program 293.

The memory 290 stores the disk array control program 291, the internal data transfer control program 292, and the user data identification control program 293. The programs are executed by the MPU 280.

Next, description will be made of how a RAID parity is set by the cache controller 300 of this invention.

Figure 2A:
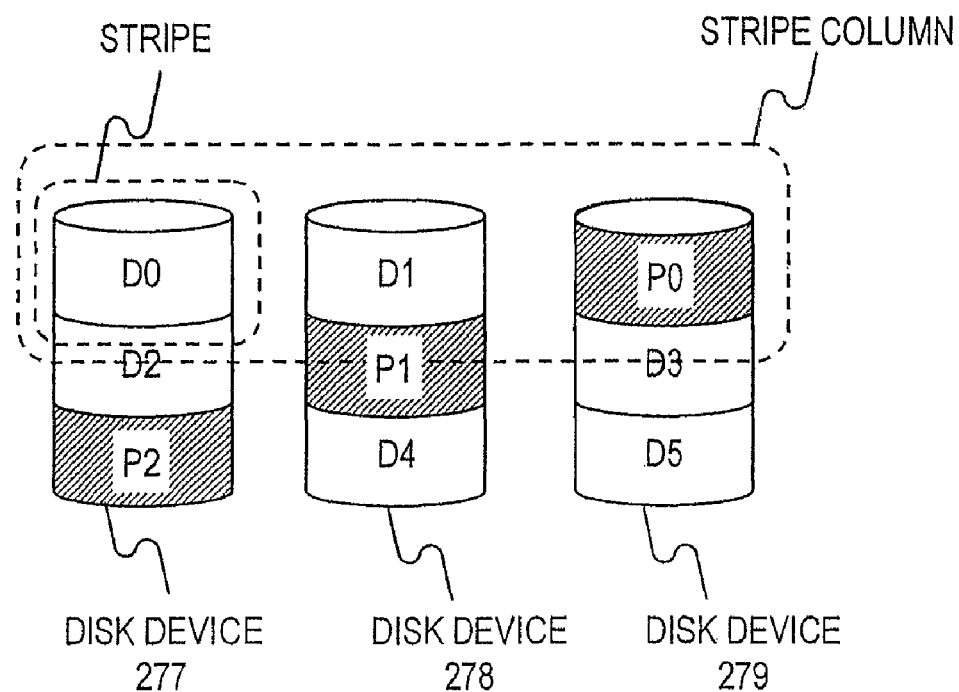
FIG. 2A is a block diagram showing a disk device group 270 according to the first embodiment of this invention.
Figure 2B:
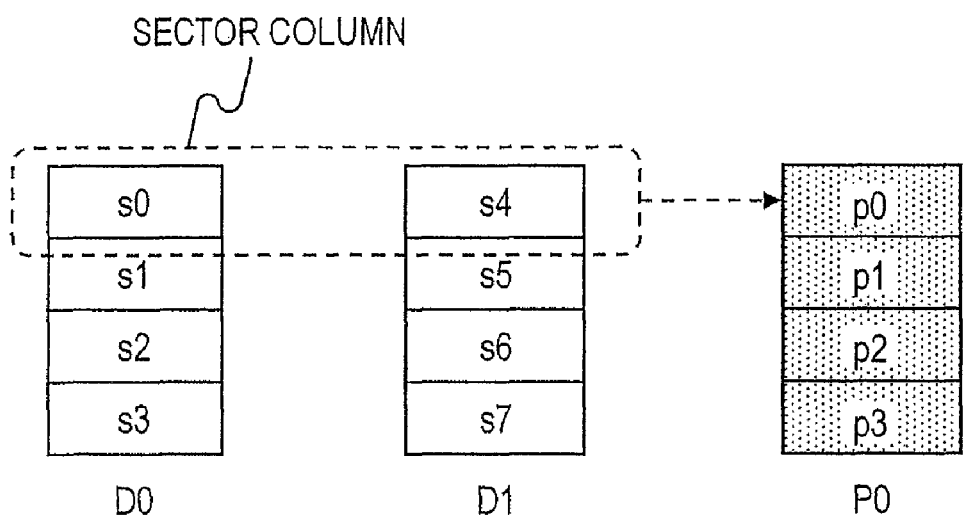
FIG. 2B is a block diagram showing data in a sector column and corresponding parity data according to the first embodiment of this invention.

FIGS. 2A and 2B are block diagrams showing the disk device group 270 of this embodiment.

As described above, the disk device group 270 of this embodiment includes three disk devices 277 to 279 that compose RAID 5. In RAID 5, any two of the three disk devices serve as data parts for storing data. The rest of the three disk devices serve as a parity part for storing a parity of the data stored in the data part of the two disk devices. The two data parts and the one parity part form a stripe column. As shown later in FIG. 4, the data stored in the data parts and the parity data stored in the parity part are each formed of an expanded data block having a size of 520 bytes.

In the example of FIG. 2A, data are stored in a stripe D0 of the disk device 277 and a stripe D1 of the disk device 278. The parity, which is obtained as an exclusive-OR between the pieces of data of the stripe D0 and the stripe D1, is stored in a stripe P0 of the disk device 279. In addition, D0 to D5 show data part and P0 to P2 (slash part) show parity part in FIG. 2A.

FIG. 2B is a block diagram showing the data and parity data in sector columns.

FIG. 2B shows in detail the stripe D0 and stripe D1 of the data part and the stripe P0 of the parity part shown in FIG. 2A.

Each of the stripes is divided to store a plurality of sectors. In the example of FIG. 2B, each stripe is set to have a size of 2 Kbytes, so four sectors are stored in one stripe. The data to be stored in the disk device is divided into sectors (s0, s1, s2, s3, s4, s5, ... ) to be arranged. In other words, divided pieces of data are arranged and stored in the sectors of the stripe.

The parity data is calculated based on the sectors in a stripe column. In other words, the exclusive-OR is calculated between sectors in the same column and in different stripes, thereby creating the parity data. In the example of FIG. 2B, the exclusive-OR calculated based on the sector "s0" and the sector "s4" creates parity data "p0". The set of sectors to be elements for calculation of the parity data is called a "sector column" in this embodiment. In the actual case, the stripe size often has a value of 64 Kbytes. The value of the stripe size is different depending on the system, and the value may be changeable in some systems.

Next, description will be made of the processing of appending, checking, and deleting an LA or an LRC to be performed by the LA/LRC append/check/delete unit 340.

The disk array system 200 of this embodiment manages and processes data received from the host computer by dividing logical blocks. Such blocks serving as minimum units for division are called "logical data blocks". The size of the logical data block is equal to a minimum unit to be read/written (in other words, sector size) from/to the disk device.

The LA/LRC append/check/delete unit 340 of the cache controller 300 appends a logical address (LA) and a longitudinal redundancy check (LRC) to each logical data block as a guarantee code.

The LA is data having a size of 4 bytes which includes part of a transfer destination address, and detects read/write of data divided into logical blocks from/to an abnormal address. The LA has consecutive values for consecutive logical data blocks.

According to this embodiment, stored in a 2-byte part of the 4-byte LA is a less significant 2-byte part of the transfer destination address (block address of write destination disk device) included in a write request from a host computer. The other 2-byte part of the 4-byte LA does not represent the transfer destination address. One bit of the unused 2-byte part is used as a user data identification bit 404. The user data identification bit 404 indicates whether or not user data has been written to the logical data block 401 to which the LA 402 including the user data identification bit 404 is appended.

For example, when the user data identification bit 404 is set to "1", write has been made by a user (in other words, host computer 100) and some user data exists in the logical data block 401. On the other hand, when the user data identification bit 404 is set to "0", write has not been made by the user and no user data exists in the logical data block 401.

The controller 280 executes the internal data transfer control program 292 stored in the memory 290 to designate a value to be appended for the LA/LRC append/check/delete unit 340. The controller 280 also executes the user data identification control program 293 stored in the memory 290 to designate the value of the user data identification bit.

The user data received from the host is divided into the units of logical data block to be stored in the host-side internal bus buffer 310 of the cache controller 300. Of the divided data, the LA/LRC append/check/delete unit 340 appends the value designated by the controller 280 and the value of the user data identification bit to the first logical data block as an LA, and appends, to the subsequent logical data blocks, values obtained by adding 1 by 1 to the value designated by the controller 280 and the value of the user data identification bit as LAs.

Further, the user data identification control program 293 references the user data identification bit included in the LA to identify whether or not the user data is stored in the designated sector. In other words, when the user data identification bit 404 is set to "1", the user data is stored in the designated sector. When the user data identification bit 404 is set to "0", the user data is not stored in the designated sector.

The value of the LRC is obtained by adding 4 bytes of the LA size to 512 bytes of the logical data block size to obtain 516-byte-long data, and dividing the 516-byte-long data from 1st byte to 516th byte into 4-byte units to calculate the exclusive-OR of the divided data.

The LA/LRC append/check/delete unit 340 uses the data of the logical data blocks and the LA values appended thereto to calculate the value of the LRC. Then, the LA/LRC append/check/delete unit 340 further appends the LRC to a value obtained by appending the LA (including the user data identification bit value) to the logical data block.

The LA/LRC append/check/delete unit 340 detects the value of the LRC, thereby being capable of detecting a bit error of data which has occurred during the data transfer and within the disk device.

It should be noted that specific methods of appending, checking, and deleting the LA/LRC are described in detail in JP 2001-202295 A and JP 2000-347815 A.

Figure 3:
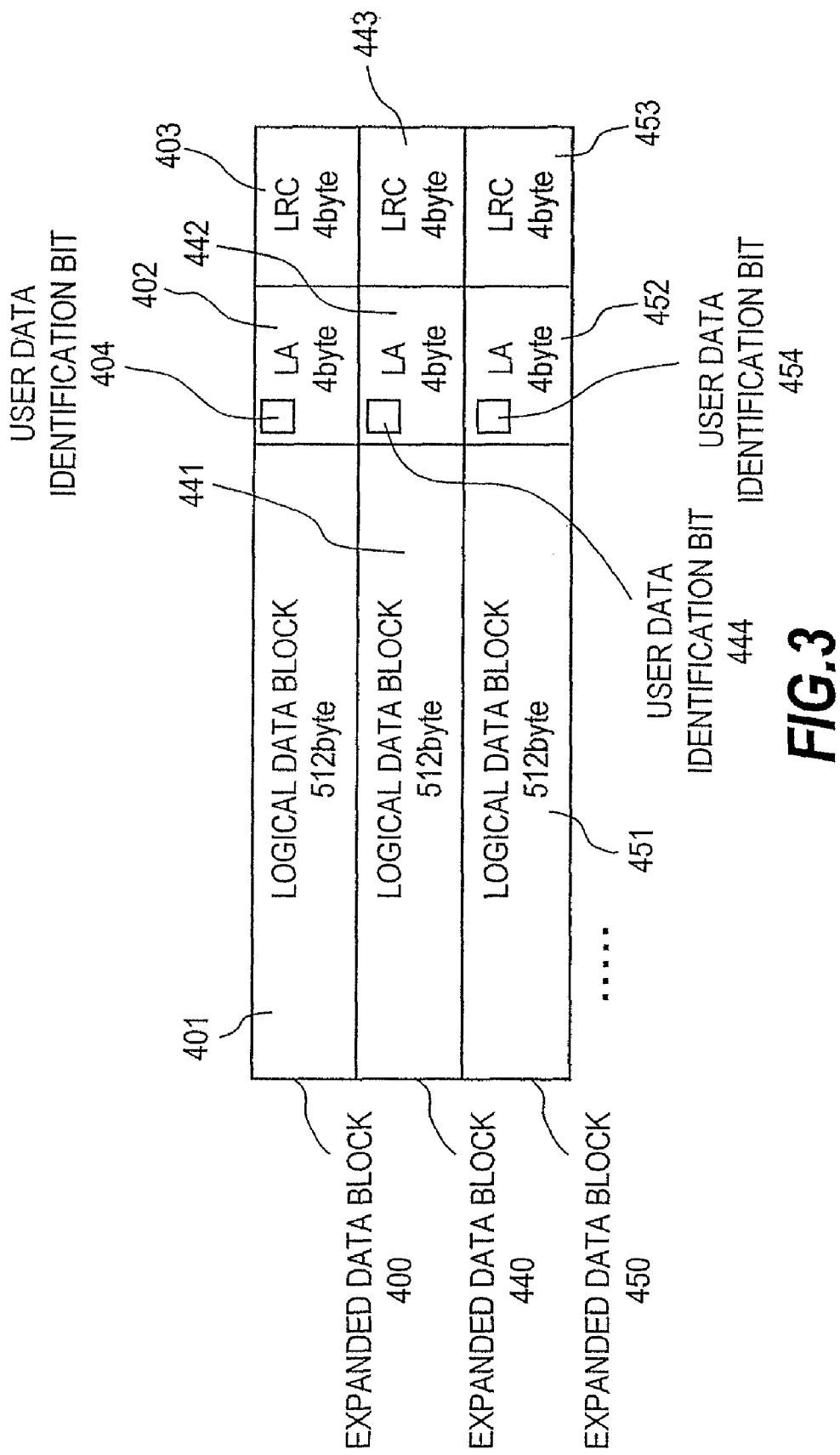
FIG. 3 shows a specific example in which LAs and LRCs are appended to logical data blocks.

FIG. 3 shows an example in which the LA/LRC append/check/delete unit 340 appends the LA and LRC to the logical data block.

Logical data blocks 401, 441, and 451 are obtained by dividing the user data transferred from the host computer A 100 to the disk array system 200 by the cache controller 300. Those three logical data blocks are originally user data in which the logical data blocks 401, 441, and 451 are arranged in the stated order.

The LA 402 is an LA corresponding to the logical data block 401, and is appended to the trailing end of the logical data block 401. The size of the LA 402 is 4 bytes.

Further, the value of the LRC 403 is obtained by adding the LA 402 to the logical data block 401 to obtain 516-byte-long data, and calculating the exclusive-OR of the 516-byte-long data in a 4-byte unit in a lateral direction (in a direction from 1st byte to 516th byte). The LRC 403 is appended to the end of the LA 402. The size of the LRC 403 is 4 bytes.

An LA 442 and LRC 443 are the LA and LRC for the logical data block 441, respectively, and an LA 452 and LRC 453 are the LA and LRC for the logical data block 451, respectively. Those are appended to the respective logical data blocks similarly to the LA 402 and the LRC 403. The LA 442 and the LA 452 include user data identification bits 444 and 454 respectively.

The 520-byte data obtained by combining the logical data block 401, LA 402, and LRC 403 results in an expanded data block 400. Similarly, data blocks denoted by reference numerals 440 and 450 are expanded data blocks 440 and 450, respectively.

The LA and LRC are appended by the LA/LRC append/check/delete unit 340 during the data transfer from the host input/output I/F 210 or 211 to the disk cache 230.

In addition, during the data transfer from the disk cache 230 to the host input/output I/Fs 210 and 211, the LA/LRC append/check/delete unit 340 checks the LA and LRC within the expanded data block read out from the disk cache 230. When no errors are found in the expanded data block in the check, the LA/LRC append/check/delete unit 340 deletes the total 8 bytes of the LA and LRC from the expanded data block. Then, the cache controller 300 transfers only the 512-byte logical data block to the host input/output I/F 210 or 211.

Accordingly, the logical data block is transferred through the host-side internal bus 220, and the expanded data block is transferred through the cache bus 231 and the disk-side internal bus 240.

The expanded data block is transferred between the disk cache 230 and the disk input/output I/F 250 or 251. When the expanded data block is to be transferred between the disk cache 230 and the disk input/output I/F 250 or 251, the LA/LRC append/check/delete unit 340 executes only the check of the LA and LRC, and when no errors are found, the expanded data block is transferred.

On the other hand, when an error relating to the LA or LRC is detected after the LA/LRC append/check/delete unit 340 checks the LA and LRC, the LA/LRC append/check/delete unit 340 notifies the controller 280 of the details of the error. The controller 280 suitably processes the error by using an error processing routine.

Figure 4:
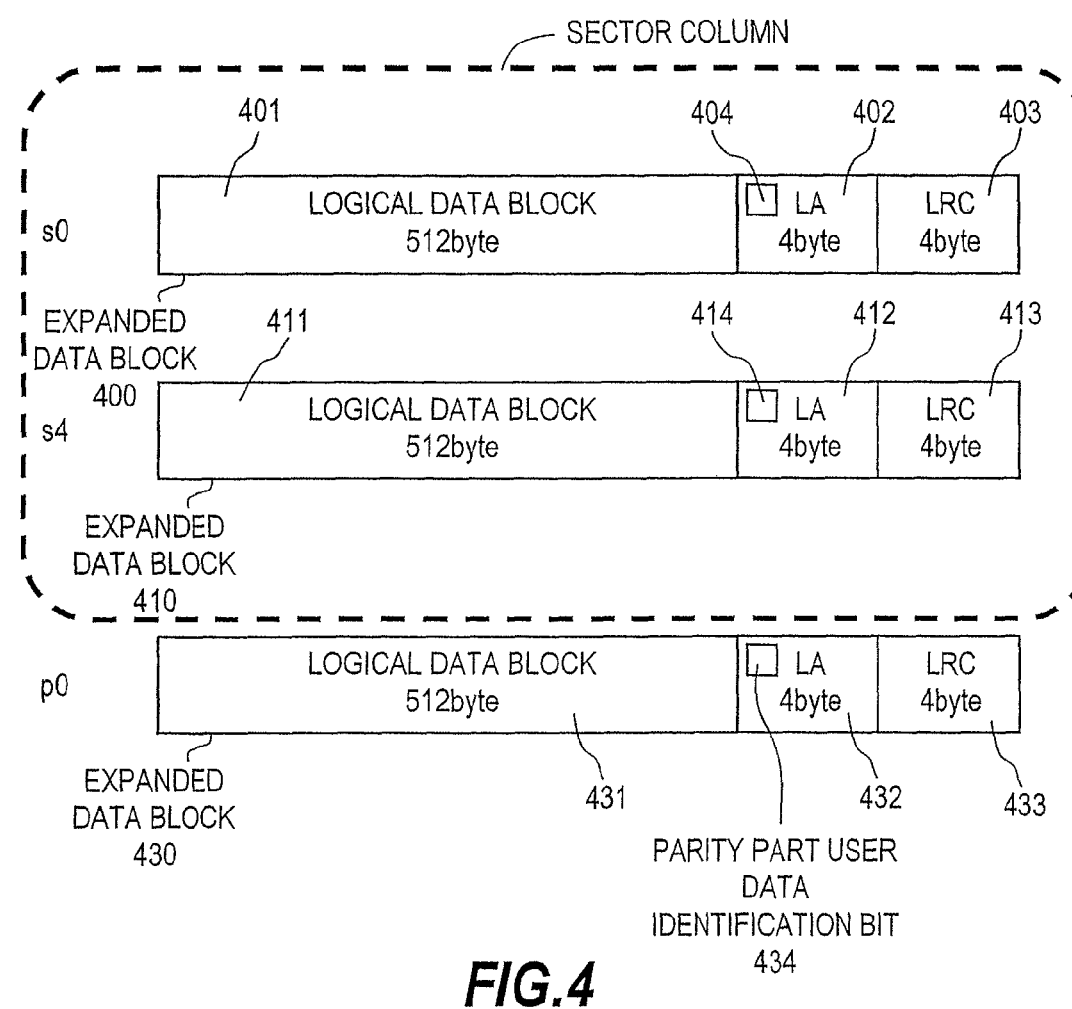
FIG. 4 is a block diagram showing the data in the sector column and the parity data.

FIG. 4 is a block diagram showing the data in the sector column and the parity data.

As described above with reference to FIG. 2B, according to this embodiment, one piece of parity data is calculated based on two sectors (sector column).

The example of FIG. 4 shows the user data identification bit 404 of the data in the sector column and a parity part user data identification bit 434 of the parity data.

As described above, the expanded data block 400 stored in the sector column has the user data identification bit 404 in the LA 402. On the other hand, the parity data (expanded data block 430) similarly has the parity part user data identification bit 434.

The logical data block 431 stores the parity based on the logical data block 401 of the sector s0 and the logical data block 411 of the sector s4. When the data in the sector column is to be stored in the disk cache 230, the parity data p0 is calculated by the disk array control program 291.

It should be noted that the exclusive-OR between the logical data block 401 of the expanded data block 400 and the logical data block 411 of the expanded data block 410 is the parity, and is stored in the logical data block 431.

The parity data has no address to be stored in the LA because there is no transfer address designated by the host. For example, when an LA 432 includes a transfer destination address for the disk device storing the parity data, an address error can similarly be checked. Further, the LRC 433 is a value obtained by calculating the exclusive-OR based on the logical data block 431 and the LA432 in a 4-byte unit.

The user data identification control program 293 executed by the controller 280 designates the parity part user data identification bit 434 included in the LA for the LA/LRC append/check/delete unit 340.

The parity part user data identification bit 434 indicates that a parity calculated based on user data in a sector column is present in the logical data block 431. In other words, the parity part user data identification bit 434 indicates whether or not user data has been written to a sector column used for calculation of a parity based on the logical data block 431. Thus, in the case where any user data has been written to at least one sector in a sector column, the parity part user data identification bit for the parity data corresponding to the sector column is "1".

In other words, when the parity part user data identification bit 434 is set to "1", the parity calculated from user data is stored in the logical data block 431. At the same time, user data has been written to the logical data block in at least one sector in the sector column corresponding to the expanded data block 430.

On the other hand, when the parity part user data identification bit 434 is set to "0", the parity calculated from user data is not stored in the logical data block 431. At the same time, user data has not been written to any sector in the sector column corresponding to the expanded data block 430.

Figure 5:
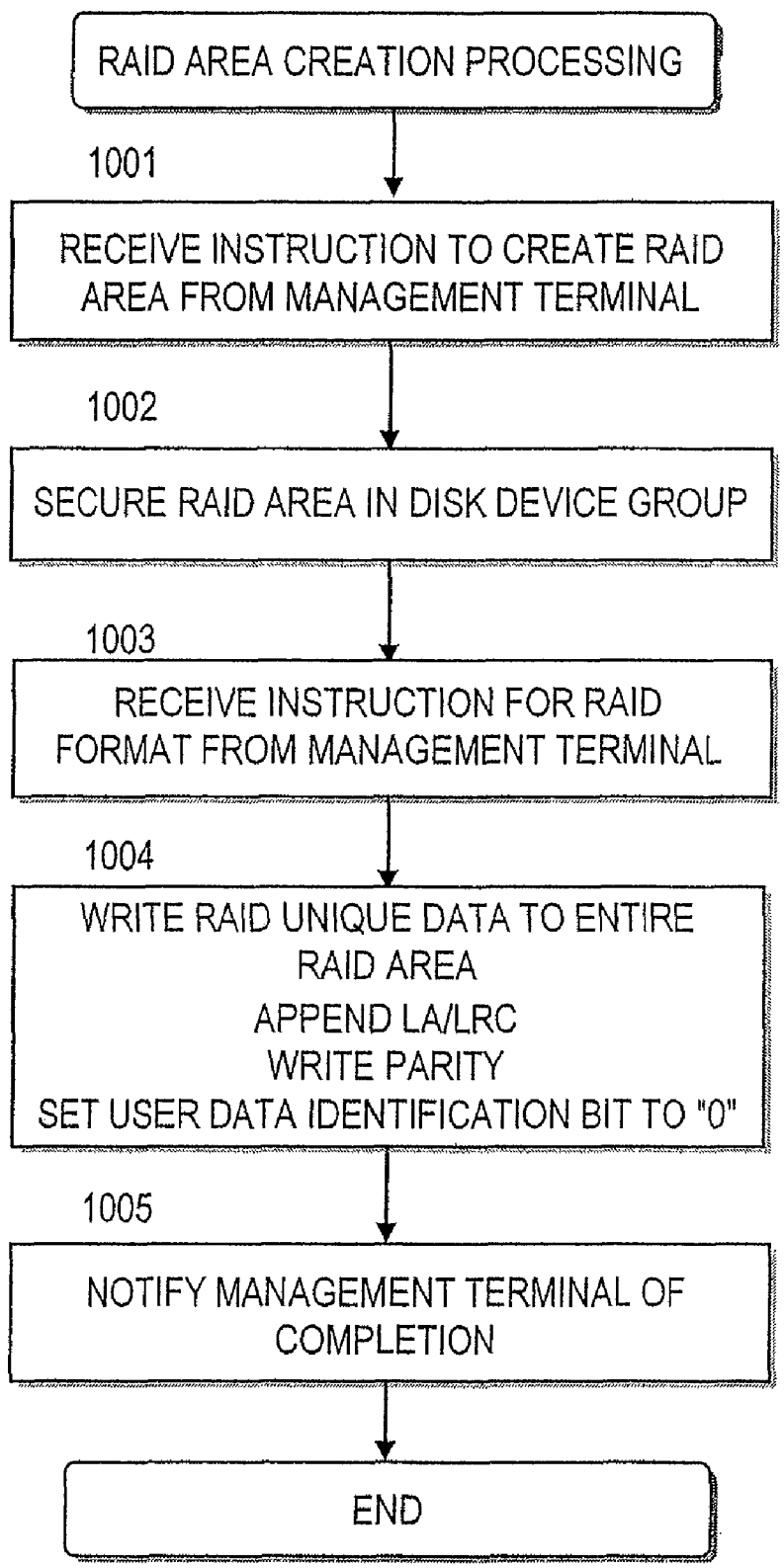
FIG. 5 is a flowchart showing a processing of creating a RAID area according to the first embodiment of this invention.

FIG. 5 is a flowchart showing a processing of creating a RAID area of the disk device group 270 according to the first embodiment of this invention. The processing is executed by the controller 280 (disk array control program 291).

The disk array system 200 sets a RAID area that can be used by the host computer 100 or the like, in the disk devices 277 to 279 provided to the disk device group 270. This setting is performed according to an instruction issued from the management terminal 150 by the user.

First, when an instruction to create a RAID area is received from the management terminal 150 (step 1001), the RAID area based on the contents of the received instruction is secured in a plurality of disk devices 277 to 279 of the disk device group 270 (step 1002). The management terminal instructs the controller 280 of a RAID type, a logical unit (LU) capacity, a stripe size, and the like. The controller 280 secures the instructed disk capacity for the plurality of disk devices 277 to 279 based on the received instruction contents. The host computer 100 regards the RAID area created in the disk device group 270 as a single logical unit (LU). It should be noted that a plurality of LUs may be set within the disk device group 270. The plurality of LUs may be different from one another depending on the RAID type, the LU capacity, and the like for each host or each file system.

Next, when a RAID format instruction for the RAID area secured in a step 1003 is received from the management terminal 150 (step 1003), RAID unique data is written to the entire RAID area, and the RAID area becomes usable as an LU of the RAID structure (step 1004).

At this time, the above-mentioned LA/LRC are appended to the data written to the data part in the RAID area. In addition, the parity corresponding to the sector column in the stripe column including the data part is calculated, so the calculated parity data is written to the parity part. The LA/LRC are appended to the parity data. The user data identification bits 404 and 414 of the data in the sector column and the parity part user data identification bit 434 of the parity data are all set to "0", which indicates that, in other words, user data is not stored.

After the above-mentioned processing ends, the controller 280 notifies the management terminal 150 that the creation of a RAID area is complete (step 1005).

Next, description will be made of identification of user data by using the user data identification bit 404.

Figure 6:
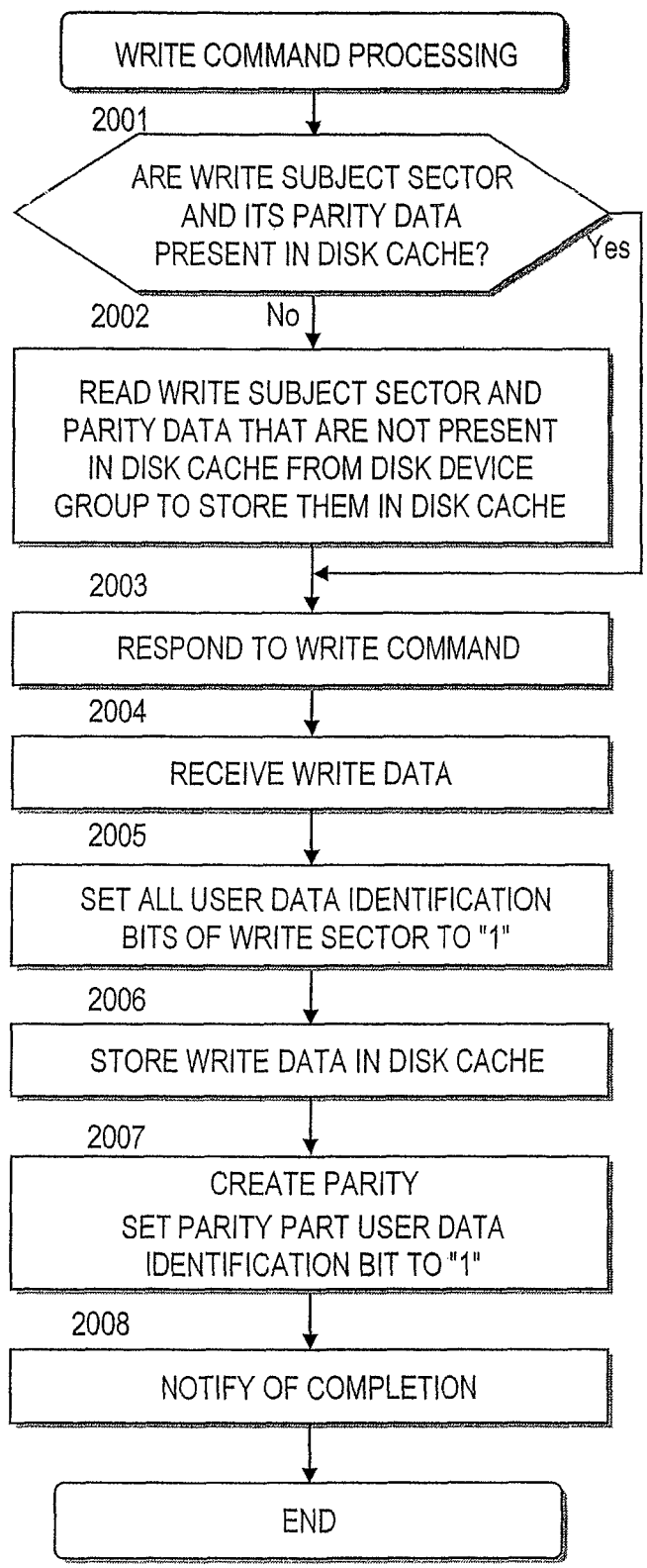
FIG. 6 is a flowchart showing a processing of writing user data according to the first embodiment of this invention.

FIG. 6 is a flowchart showing a processing of writing user data according to the first embodiment of this invention. This processing is executed by the controller 280 (disk array control program 291).

Upon reception of the write request from the host computer A 100, the controller 280 of the disk array system 200 judges whether or not the sectors designated in the write request and the parity data (expanded data block 430) corresponding to the sector column including the sectors are all stored in the disk cache 230 (step 2001).

When it is judged that the sectors and/or parity data relating to the request are not stored in the disk cache 230, the sectors and/or parity data relating to the request are read out from the disk device group 270 and stored in the disk cache 230 (step 2002). At this time, when part of the parity data corresponding to the sector is stored in the disk cache 230, the sectors or the corresponding parity data stored in disk cache 230 are used, and the sectors and the corresponding parity data that are not stored in disk cache 230 are read out from the disk devices 277 to 279.

When it is judged that all the requested sectors and the corresponding parity data are stored in the disk cache 230, the processing advances to a step 2003 without reading out the sectors and the corresponding parity data from the disk devices 277 to 279. It should be noted that the sectors and the corresponding parity data read out from the disk devices 277 to 279 are stored in the disk cache 230 as the expanded data block having a size of 520 bytes.

Next, a response to the received write request (write command permit notification) is sent to the host computer A 100 (step 2003).

Upon reception of the write command permit notification, the host computer A 100 sends user data to be written to the requested sector to the disk array system 200.

Upon reception of user data to be written to the disk device group 270 (step 2004), the controller 280 divides the user data for each logical data block in order to store the user data in a plurality of disk devices. Then, the controller 280 sets the user data identification bit 404 included in the LA 402 to be appended to the logical data block to "1" (step 2005).

To be specific, user data to be written is sent to the cache controller 300 via the host input/output I/F 210 or 211 and the host-side internal bus 220. At the cache controller 300, the LA/LRC append/check/delete unit 340 appends the LA and LRC to the user data.

The user data identification control program 293 instructs the LA/LRC append/check/delete unit 340 which of "1" and "0" the user data identification bit 404 included in the LA 402 is to be set to. The user data is written herein according to the write request, the user data identification control program 293 instructs the user data identification bit 404 included in the LA 402 to be set to "1" that indicates that the user data is present.

The LA 402 and LRC 403 whose user data identification bits 404 are set to "1" are appended to the logical data block 401 to create the expanded data block 400. The expanded data block 400 is stored in the disk cache 230 (step 2006).

Similarly, when the write data from the host has a plurality of sectors, the LA 412 and LRC 413 are appended to the logical data block 411 to create the expanded data block 410. The expanded data block 410 is stored in the disk cache 230.

Next, the parity corresponding to the sectors to which the data is to be written according to the write request is created. In a system using the RAID 5, the exclusive-OR based on old data, an old parity, and new data is normally used to calculate a new parity. The created parity is the logical data block 431. The LA 432 and LRC 433 are appended to the logical data block 431, while the parity part user data identification bit 434 is set to "1". The expanded data block 430 to which the LA 432 and LRC 433 are appended and in which the parity part user data identification bit 434 of the LA 432 is set to "1", is stored in the disk cache 230 (step 2007).

When the expanded data blocks 400 and 410 in the sector column and the parity data (expanded data block 430) are stored in the disk cache 230, the controller 280 sends a message (completion) indicating that the data has been written completely to the host computer A 100 (step 2008). It should be noted that at an arbitrary timing or upon a predetermined operation, the expanded data block stored in the disk cache 230 is de-staged and stored in the disk device group 270.

As described above, in the disk array system 200, the user data identification bit 404 is set for the LA 402 to be appended to the logical data block 401, and the parity part user data identification bit 434 is set for the LA 432 of the parity data. According to a processing described later, the disk array system 200 can reference the user data identification bit 404 or the parity part user data identification bit 434 to identify whether or not the user data exists.

It should be noted that in the case where the data having a larger size than a stripe column has been written from the host, can calculate the parity based on only the written data, the old data and the old parity are unnecessary for the calculation of the parity, so the steps 2001 and 2002 may be omitted.

Next, description will be made of correction copy.

In the correction copy, when there occurs a failure in any one of the disk devices in the disk device group 270, the disk array system 200 restores the contents of the disk device experiencing the failure into another new disk device functioning as a spare disk device.

To be specific, in the above-mentioned RAID 5 structure, when a failure occurs in any one of the three disk devices 277 to 279 storing two data parts and one parity part, the data of the disk device experiencing the failure is restored from the data stored in the other two normal disk devices and the parity data.

In the same stripe column, the exclusive-OR of the data stored in two disk devices is equal to the data stored in the rest of the three disk devices. By using this fact, when a failure occurs in one of the three disk devices, the data of the disk device experiencing the failure is restored from the exclusive-OR of the data stored in the other two disk devices. In other words, the correction copy can be performed.

The correction copy according to this invention herein uses the user data identification bit 404 to set only the sector column storing the user data as a target to be restored.

Figure 7:
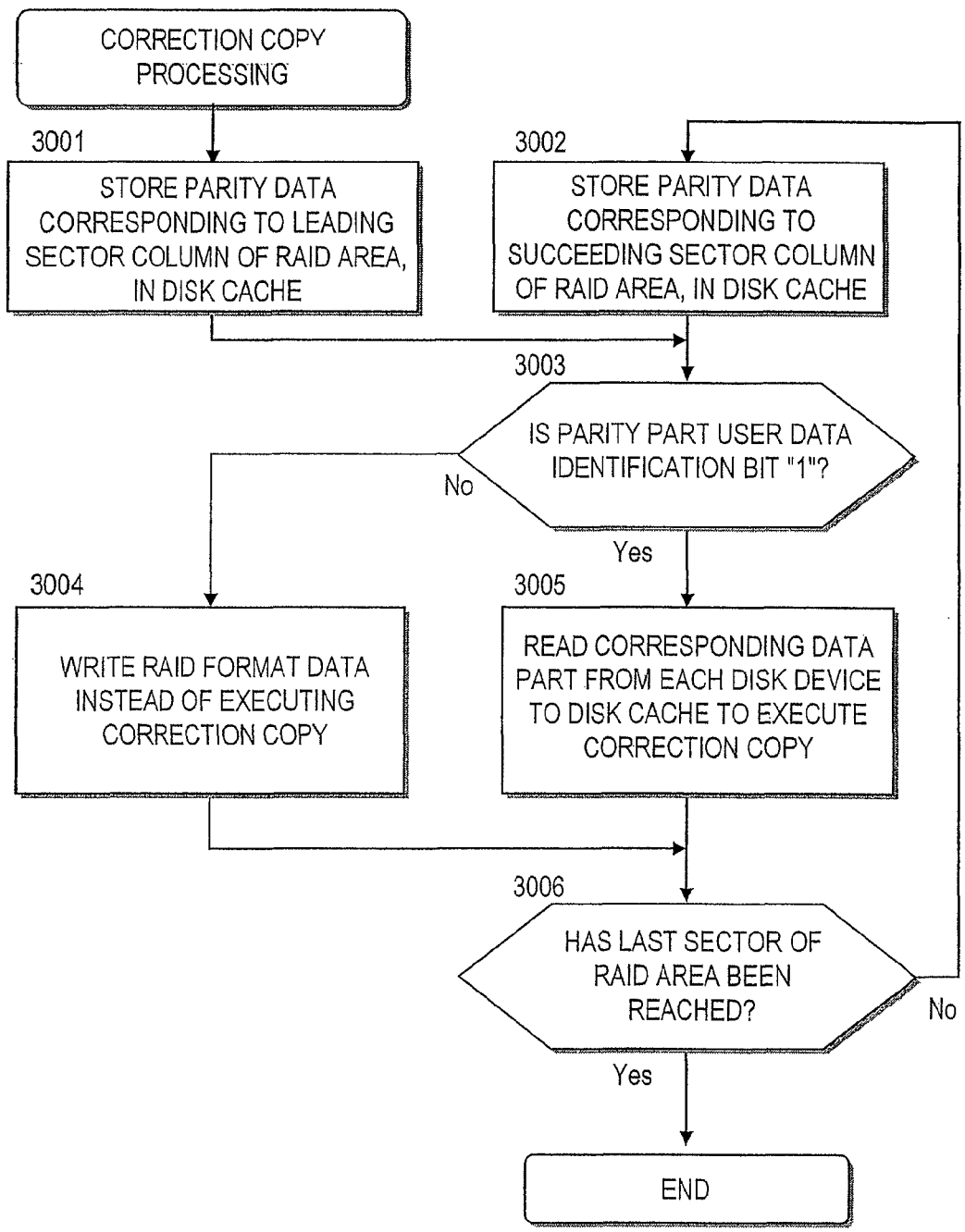
FIG. 7 is a flowchart showing a processing for correction copy according to the first embodiment of this invention.

FIG. 7 is a flowchart showing a processing for the correction copy according to the first embodiment of this invention. The processing is executed by the controller 280 (disk array control program 291).

The controller 280 starts the processing when detecting that a failure occurs in a disk or in response to an instruction from the management terminal 150.

First, the parity data corresponding to the leading sector column of the RAID area is read out from the disk device, and is stored in the disk cache 230 (step 3001). When the parity data has already been stored in the disk cache 230, the processing advances to a step 3003 without reading out the parity data from the disk device.

It should be noted that in the case where the parity data cannot be read out from the disk device whose parity part has been experiencing a failure, the other two disk devices are found to be data parts. In this case, the parity data is calculated from the sector column of the two data parts in the correction copy (step 3005), and written to a spare disk device.

Next, it is judged whether or not the parity part user data identification bit 434 of the parity data is "1" (step 3003).

When the parity part user data identification bit 434 of the parity data is not "1" (when the parity part user data identification bit 434 of the parity data is "0"), no user data is stored in the sector column corresponding to the parity data. Accordingly, the data in the corresponding sector column need not be restored, so the correction copy is not to be performed. RAID format data is written to the sector of the spare disk device corresponding to the above sector column (step 3004).

On the other hand, when the parity part user data identification bit 434 is "1", user data is stored in the sector column corresponding to the parity data. The data stored in a sector in the sector column corresponding to a disk device experiencing no failure is read out and stored in the disk cache 230. Then, the correction copy is performed using the read data and the parity data (step 3005).

It should be noted that in the case where the parity data cannot be read out from the disk device whose parity part has been experiencing a failure, since the parity part user data identification bit 434 cannot be obtained, all pieces of data in the corresponding sector column are obtained, and the user data identification bit 404 included in the data is referenced to judge the presence/absence of user data.

In the correction copy, the data of the data part experiencing a failure is restored from the data of the data part experiencing no failure and the parity data, and stored in a spare disk device. For example, when a failure occurs in the disk device storing the expanded data block 410, the exclusive-OR is calculated between the data stored in the logical data block 401 of one sector in the sector column and the data stored in the logical data block 431 of the sector for a parity. The calculated exclusive-OR is the data that is previously stored in the logical data block 411 of the sector corresponding to the disk device that has been experiencing a failure.

After that, it is judged whether or not the sector column corresponding to the parity data read out in the step 3001 is the last sector column of the RAID area (step 3006).

When it is judged that the parity data of the last sector of the RAID area has been read out, the correction copy has completed up to the last sector of the RAID area, so the processing for the correction copy ends.

On the other hand, when it is judged that the parity data of the last sector of the RAID area has not been read out, the correction copy has not completed up to the last sector of the RAID area, so the processing returns to a step 3002.

In the step 3002, the parity data corresponding to the succeeding sector column of the RAID area is read out and stored in the disk cache 230. When the parity data has already been stored in the disk cache 230, the processing advances to the step 3003 without reading out the parity data from the disk device.

The correction copy as described above makes it possible that when a failure occurs in one of the plurality of disk devices composing a RAID array, the data that is previously stored in the disk device that has been experiencing the failure is restored into a new disk device. According to this embodiment, the correction copy is performed only on the sector column including user data, so the time required for the correction copy can be reduced.

In particular, the presence/absence of the user data in the sector column is checked not based on the user data identification bits 404 of related pieces of data, but based on the parity part user data identification bit 434 of the parity data corresponding to the sector column. Accordingly, the processing time can be reduced with high effectiveness.

When there is no spare disk device in the disk array system 200, an administrator may remove the disk device experiencing a failure, and replace it with a new disk device, thereby setting the new disk device as the spare disk device.

It should be noted that the presence/absence of user data is not checked based on the parity part user data identification bit 434, but the user data may be judged based on the user data identification bits 404 of the data of related disk devices.

Further, during the processing for the correction copy, when another failure occurs in a disk device other than the disk device experiencing one failure, blocking of (access stop to) the RAID area is generally performed. According to this embodiment of this invention, it can be check the presence/absence of the data of the sector column based on the parity part user data identification bit 434. Therefore, when data is not stored in the disk device in which a failure has occurred, the blocking of the RAID area is unnecessary. As a result, the operation of tasks can be maintained without stopping the access from the host computer A 100.

Figure 8:
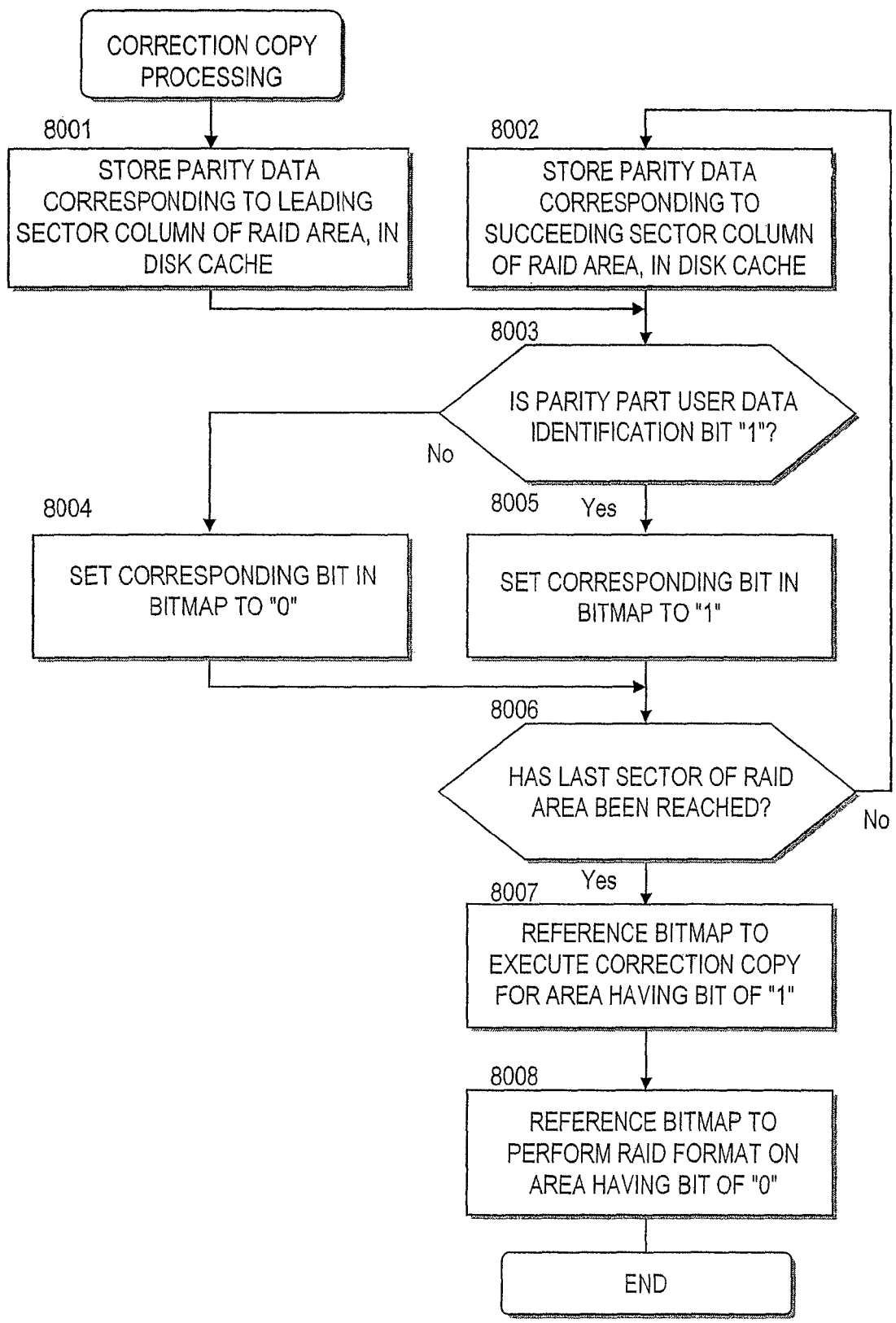
FIG. 8 is a flowchart showing a processing for correction copy according to a modified example of the first embodiment of this invention.

FIG. 8 is a flowchart showing a correction copy processing according to a modified example of the first embodiment of this invention.

Figure 9:
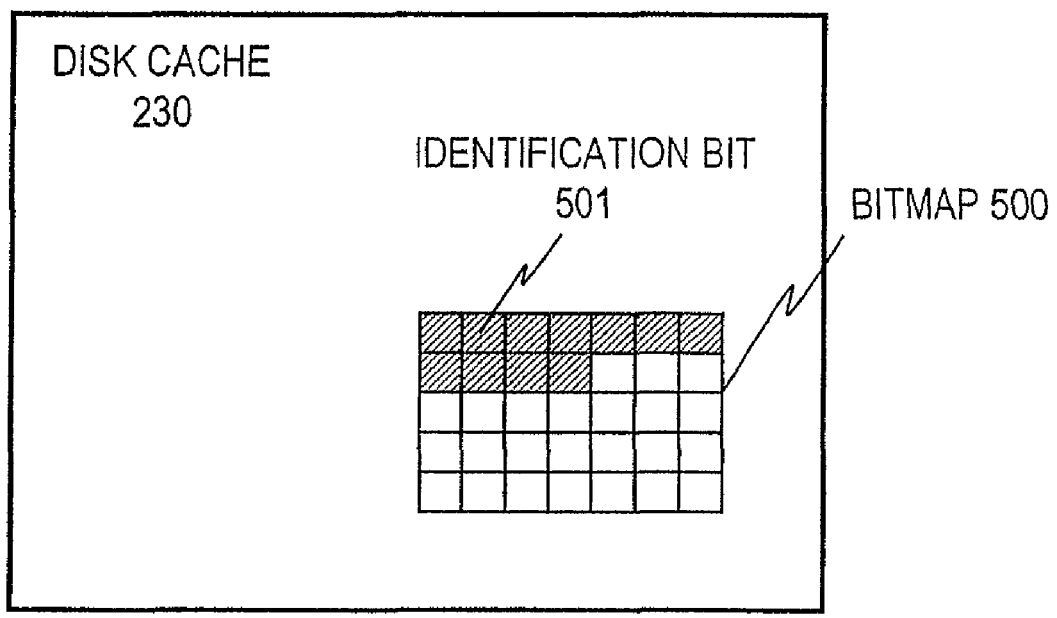
FIG. 9 is an explanatory diagram showing a bitmap 500 according to the first embodiment of this invention.

In FIG. 7, the presence/absence of user data is identified based on the parity part user data identification bit 434, and the processing is executed for every data. According to this modified example, a bitmap 500 as shown in FIG. 9 composed of a plurality of identification bits 501 corresponding to the parity part user data identification bits 434 is created in the disk cache 230. The bitmap 500 is referenced for collective processings to increase the speed of the entire processing.

The processing of FIG. 8 is executed by the controller 280 (disk array control program 291).

The controller 280 starts the processing when detecting that a failure occurs in a disk or in response to an instruction from the management terminal 150.

First, the parity data corresponding to the leading sector column of the RAID area is read out from the disk device, and is stored in the disk cache 230 (step 8001). When the parity data has already been stored in the disk cache 230, the processing advances to a step 8003 without reading out the parity data from the disk device.

It should be noted that in the case where the parity data cannot be read out from the disk device whose parity part has been experiencing a failure, the other two disk devices are found to be data parts. In this case, the parity data is calculated from the sector column of the two data parts in the correction copy (step 8007), and written to a spare disk device.

Next, it is judged whether or not the parity part user data identification bit 434 of the parity data is "1" (step 8003).

When the parity part user data identification bit 434 of the parity data is not "1" (when the parity part user data identification bit 434 of the parity data is "0"), no user data is stored in the sector column corresponding to the parity data. Accordingly, the data in the corresponding sector column need not be restored. In order to indicate that the correction copy is not to be performed, the identification bit 501 corresponding to the sector column is set to "0" (step 8004).

On the other hand, when the parity part user data identification bit 434 is "1", user data is written to the sector column corresponding to the parity data, and in order to indicate that the user data is present, the identification bit 501 corresponding to the sector column corresponding to the parity data is set to "1" (step 8005). After that, the processing advances to a step 8006.

It should be noted that in the case where the parity data cannot be read out from the disk device whose parity part has been experiencing a failure, since the parity part user data identification bit 434 cannot be obtained, all pieces of data in the corresponding sector column are obtained, and the user data identification bit 404 included in the data is referenced to judge the presence/absence of user data and set the identification bit 501.

As shown in FIG. 9, the identification bit 501 is stored as the bitmap 500 provided to the disk cache. One bit of the bitmap 500 corresponds to one sector column of the RAID area (LU). When user data is written to at least one sector in the sector column, the identification bit 501 is set to "1". When user data is not written to any sector column, the identification bit 501 is set to "0".

After that, it is judged whether or not the sector column corresponding to the parity data read out in the step 8001 is the last sector column of the RAID area (step 8006).

When it is judged that the parity data of the last sector of the RAID area has been read out, the setting of a bitmap has completed up to the last sector of the RAID area, so the processing advances to the step 8007.

On the other hand, when it is judged that the parity data of the last sector of the RAID area has not been read out, the setting of a bitmap has not completed up to the last sector of the RAID area, so the processing returns to a step 8002.

In the step 8002, the parity data corresponding to the succeeding sector column of the RAID area is read out and stored in the disk cache 230. When the parity data has already been stored in the disk cache 230, the processing advances to the step 8003.

In the step 8007, the bitmap 500 is referenced to obtain all the sector columns corresponding to the identification bits

501 that are set to "1" in the bitmap. Then, the correction copy is performed on the sectors in all the sector columns that have been obtained (step 8007).

For example, when a failure occurs in the disk device storing the expanded data block 410, the exclusive-OR is calculated between the data stored in the logical data block 401 of the data part and the data stored in the logical data block 431 of the parity part. The calculated exclusive-OR is the data that is previously stored in the logical data block of the disk device that has been experiencing a failure.

Next, the bitmap 500 is referenced to write RAID format data to the sector column corresponding to the identification bit 501 set to "0" (step 8008). The processing has completed on all sectors, the correction copy processing ends.

In the correction copy processing according to the modified example described above, the bitmap 500 is used to identify the presence/absence of user data in the corresponding sector column, and then the correction copy is performed only on the sector including user data. Accordingly, the number of accesses to the disk device (or disk cache 230) is reduced, and the processing time and processing loads can be reduced.

Next, description will be made of LU copy executed within a system in the disk array system 200.

As described above, a plurality of LUs can be set in the disk device group 270. Among the plurality of LUs, all the contents of a given LU can be copied to another LU.

Figure 10:
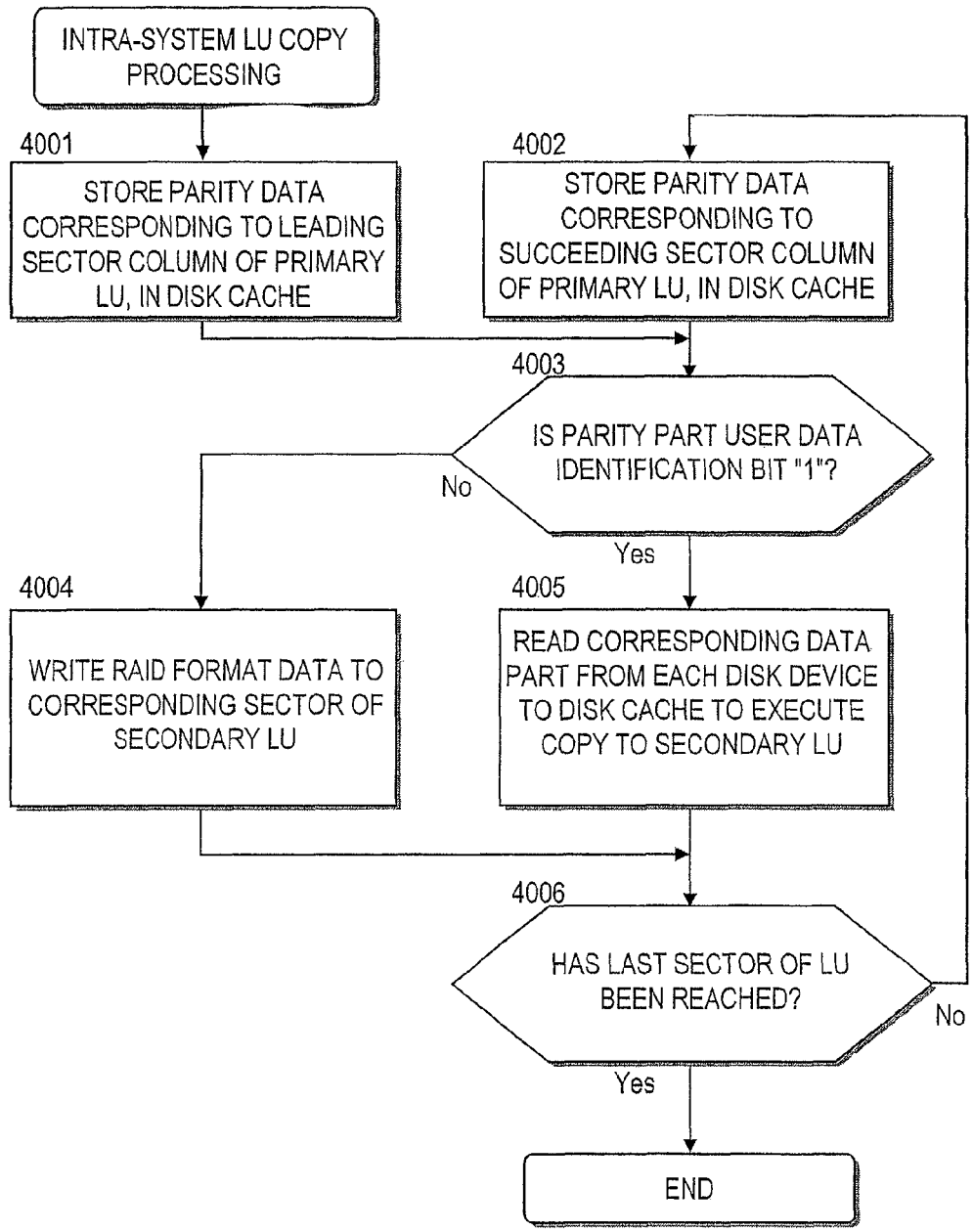
FIG. 10 is a flowchart showing an intra-system LU copy processing according to the first embodiment of this invention.

FIG. 10 is a flowchart showing an intra-system LU copy processing according to the first embodiment of this invention. The processing is executed by the controller 280 (internal data transfer control program 292).

The intra-system LU copy processing is started in response to a request from the management terminal 150 or the host computer 100.

First, the parity data corresponding to the sector column including the leading sector of primary LU is read out from the disk device, and is stored in the disk cache 230 (step 4001). When the parity data has already been stored in the disk cache 230, the processing advances to a step 4003 without reading out the parity data from the disk device.

Next, it is judged whether or not the parity part user data identification bit 434 of the parity data is "1" (step 4003).

When the parity part user data identification bit 434 of the parity data is not "1" (when the parity part user data identification bit 434 of the parity data is "0"), no user data is stored in the sector column corresponding to the parity data. Accordingly, the data in the sector column need not be copied, so RAID format data is written to the sector corresponding to the sector column of the secondary LU (step 4004). At this time, the parity data corresponding to the sector column is calculated and written thereto.

On the other hand, when the parity part user data identification bit 434 is "1", user data is stored in the sector column corresponding to the parity data. All the data stored in the sector column are read out from the disk device and stored in the disk cache 230. Then, the read data is written to the corresponding secondary LU (step 4005). At this time, the parity is calculated on the secondary LU and written thereto.

After that, it is judged whether or not the sector column corresponding to the parity data read out in the step 4001 is the last sector column of the primary LU (step 4006).

When it is judged that the parity data of the last sector of the primary LU has been read out, the copy has completed up to the last sector of the primary LU, so the intra-system LU copy processing ends.

On the other hand, when it is judged that the parity data of the last sector of the primary LU has not been read out, the copy processing has not completed up to the last sector of the primary LU, so the processing returns to a step 4002.

In the step 4002, the parity data corresponding to the succeeding sector column of the primary LU is read out and stored in the disk cache 230. When the parity data has already been stored in the disk cache 230, the processing advances to the step 4003 without reading out the parity data from the disk device.

The intra-system LU copy processing as described above makes it possible that the contents of the LU having a given RAID structure are copied intact to another LU. According to this embodiment, the copy is performed only on the sector column including user data, so the time required for the inter-LU copy can be reduced.

In particular, the presence/absence of the user data in the sector column is checked not based on the user data identification bits 404 of related pieces of data, but based on the parity part user data identification bit 434 corresponding to the sector column. Accordingly, the processing time can be reduced with high effectiveness.

It should be noted that the presence/absence of user data is not checked based on the parity part user data identification bit 434, but the user data may be judged based on the user data identification bits 404 of the data of related disk devices.

Further, the RAID structure may be different between the primary LU and the secondary LU.

Next, description will be made of LU copy between the disk array systems 200.

As shown in FIG. 1, the disk array system 200A and the disk array system 200B are connected to each other via the bus switch 130. In an inter-system LU copy processing as described below, all the data stored in a given LU within the disk array system 200A are copied to the LU of the disk array system 200B.

Figure 11:
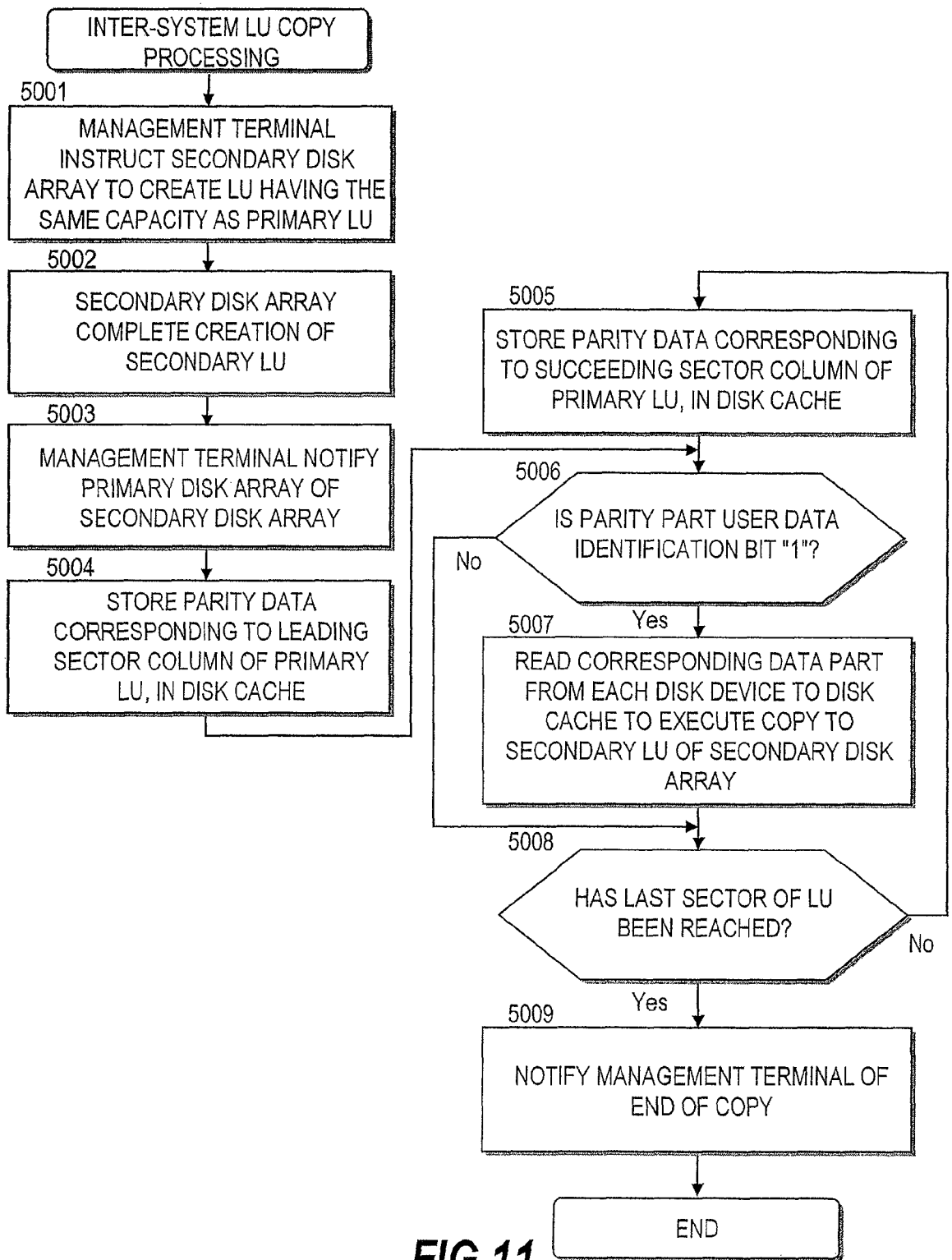
FIG. 11 is a flowchart showing an inter-system LU copy processing according to the first embodiment of this invention.

FIG. 11 is a flowchart showing an inter-system LU copy processing according to the first embodiment of this invention. The processing is executed by the controller 280 (internal data transfer control program 292).

First, the management terminal 150 instructs the secondary disk array system 200B to create an LU having the same capacity as the primary disk array system 200A (step 5001). At this time, the RAID structure may be different therebetween. In the secondary disk array system 200B, the controller 280 that has received the instruction to create the LU from the management terminal 150 performs a RAID area creation processing as shown in FIG. 5. After completion of this processing, the management terminal 150 is notified of completion of the LU creation (step 5002).

Having been notified of the completion of the LU creation from the secondary disk array system 200B, the management terminal 150 notifies the primary disk array system 200A of the secondary disk array system, and issues a request to start the inter-system copy (step 5003).

In the primary disk array system 200A, upon reception of the request from the management terminal 150, the controller 280 reads out the parity data corresponding to the leading sector column from the primary LU, and stores the parity data in the disk cache 230 (step 5004). It should be noted that when the parity data has already been stored in the disk cache 230, the processing advances to the step 5006 without reading out the parity data from the disk device.

Next, it is judged whether or not the parity part user data identification bit 434 of the parity data is "1" (step 5006).

When the parity part user data identification bit 434 of the parity data is not "1" (when the parity part user data identification bit 434 of the parity data is "0"), no user data is stored in the sector column corresponding to the parity data. Accordingly, the data in the sector column need not be copied, so the processing advances to a step 5008 without transferring the data to the secondary disk array system 200B.

On the other hand, when the parity part user data identification bit 434 is "1", user data is stored in the sector column corresponding to the parity data. All the data stored in the sector column are read out from the disk device and stored in the disk cache 230. Then, the read data in the sector column is sent to the secondary disk array system 200B. In the secondary disk array system 200B, the received data is written to the corresponding sector column of the secondary LU (step 5007). At this time, the processing becomes more efficient by checking the user data identification bit 404 of the data and sending only the data whose user data identification bit 404 is "1" to the secondary disk array system 200B.

The secondary disk array system 200B receives and processes the write data from the primary disk array system 200A similarly to the write command from the host computer A 100. The processing is performed in the same manner as FIG. 6.

After that, it is judged whether or not the sector column corresponding to the parity data read out in the step 5004 is the last sector column of the primary LU (step 5008).

When it is judged that the parity data of the last sector of the primary LU has been read out, the copy has completed up to the last sector of the primary LU, so the primary disk array system 200A notifies the management terminal 150 of the end of the inter-system copy (step 5009) and the inter-system LU copy processing ends.

On the other hand, when it is judged that the parity data of the last sector of the primary LU has not been read out, the copy processing has not completed up to the last sector of the primary LU, so the processing returns to a step 5005.

In the step 5005, the parity data corresponding to the succeeding sector column of the primary LU is read out and stored in the disk cache 230. When the parity data has already been stored in the disk cache 230, the processing advances to the step 5006 without reading out the parity data from the disk device.

The inter-system LU copy processing as described above makes it possible that the contents of the LU having a given disk array system are copied intact to another LU. According to this embodiment, the copy is performed only on the sector column including user data, so the time required for the LU copy between disk array systems can be reduced.

In particular, the presence/absence of the user data in the sector column is checked not based on the user data identification bits 404 of related data parts, but based on the parity part user data identification bit 434 of the parity data corresponding to the sector column. Accordingly, the processing time can be reduced with high effectiveness.

It should be noted that the presence/absence of user data is not checked based on the parity part user data identification bit 434 of the parity data, but the user data may be judged based on the user data identification bits 404 of the data of related disk devices.

Further, the steps 5001 and 5002 can be omitted from the processing when the secondary disk array system 200B has (1) a function of making an LU available without formatting and (2) a function of performing RAID format on all sectors except the sectors to which data has been written from the primary disk array system 200A.

Next, description will be made of an LU integration processing.

As described above, a plurality of LUs can be set in the disk device group 270. Those plurality of LUs can be combined (integrated) into one LU.

Figure 12:
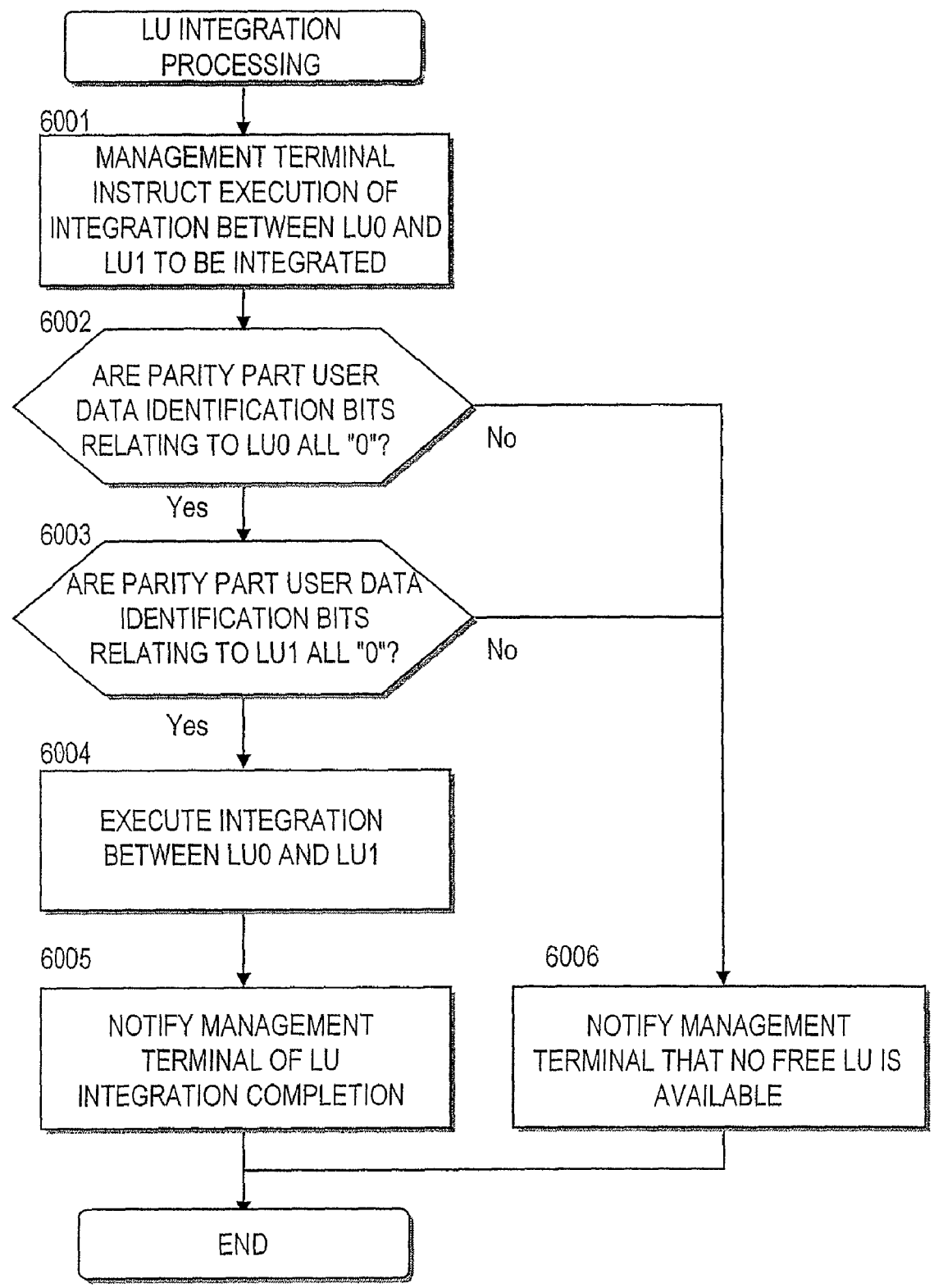
FIG. 12 is a flowchart showing an LU integration processing according to the first embodiment of this invention.

FIG. 12 is a flowchart showing an LU integration processing according to the first embodiment of this invention. The processing is executed by the controller 280 (internal data transfer control program 292).

In the LU integration processing, two LUs "LU0" and "LU1" are integrated into one LU.

The processing starts in response to a request from the management terminal 150.

First, the management terminal 150 sends an LU integration instruction with the LU numbers of LUs to be integrated being designated as "LU0" and "LU1" (step 6001).

In the disk array system 200, upon reception of the instruction, the controller 280 first obtains the parity part user data identification bits 434 of all the parity data of the LU0, and judges whether or not all the parity part user data identification bits 434 are "0" (step 6002).

When at least one of the parity part user data identification bits 434 of the LU0 is not "0" (when at least one of the parity part user data identification bits 434 is "1"), user data has been written to at least one sector of LU0. In the LU integration processing, the data stored in the data part of the LU becomes meaningless data after the integration of LUs, which is substantially equivalent to erasure of the data. In order to avoid this, the management terminal 150 is notified that data is present in the LU0 to be integrated and is not a free LU (step 6006), and an instruction is requested from the user. The user of the management terminal 150 learns that data is present in the LU based on the notification.

When all the parity part user data identification bits 434 of the LU0 are "0", similarly to the step 6002, the controller 280 next obtains the parity part user data identification bits 434 of all the parity data of the LU1, and judges whether or not all the parity part user data identification bits 434 are "0" (step 6003).

When at least one of the parity part user data identification bits 434 is not "0" (when at least one of the parity part user data identification bits 434 is "1"), user data has been written to at least one sector of LU1, so the management terminal 150 is notified that data is present in the LU1 and is not a free LU (step 6006).

When all the parity part user data identification bits 434 of the LU0 and the LU1 are "0", an integration processing is performed on the LU0 and the LU1 (step 6004). To be specific, the internal setting is performed on the disk array system 200A so that the LU0 and the LU1 appear to be one LU with respect to the outside. After completion of this integration processing, the management terminal 150 is notified of completion of the LU integration (step 6005).

The LU integration processing described above allows the integration of a plurality of LUs into one LU. When the plurality of LUs are integrated, the data of the LU to be integrated will be lost. In this embodiment, in order to prevent this, it is judged whether or not user data has been written to the LU to be integrated. At this time, the presence/absence of user data in a sector column is checked not based on the user data identification bits 404, but based on the parity part user data identification bit 434 of the parity data corresponding to the sector column. Accordingly, the administrator can learn in advance which LU has user data written thereto, and the LU having user data written thereto can be prevented from being integrated erroneously.

It should be noted that the presence/absence of user data is not checked based on the parity part user data identification bit 434, but the user data may be judged based on the user data identification bits 404 of the data of related disk devices.

Next, description will be made of online verification.

The term "online verification" represents that the disk array system 200 executes verification check on each sector of a disk device in order to check whether or not a failure has occurred in the disk devices 277 to 279 during an idle state or when process loads are small or the like.

Figure 13:
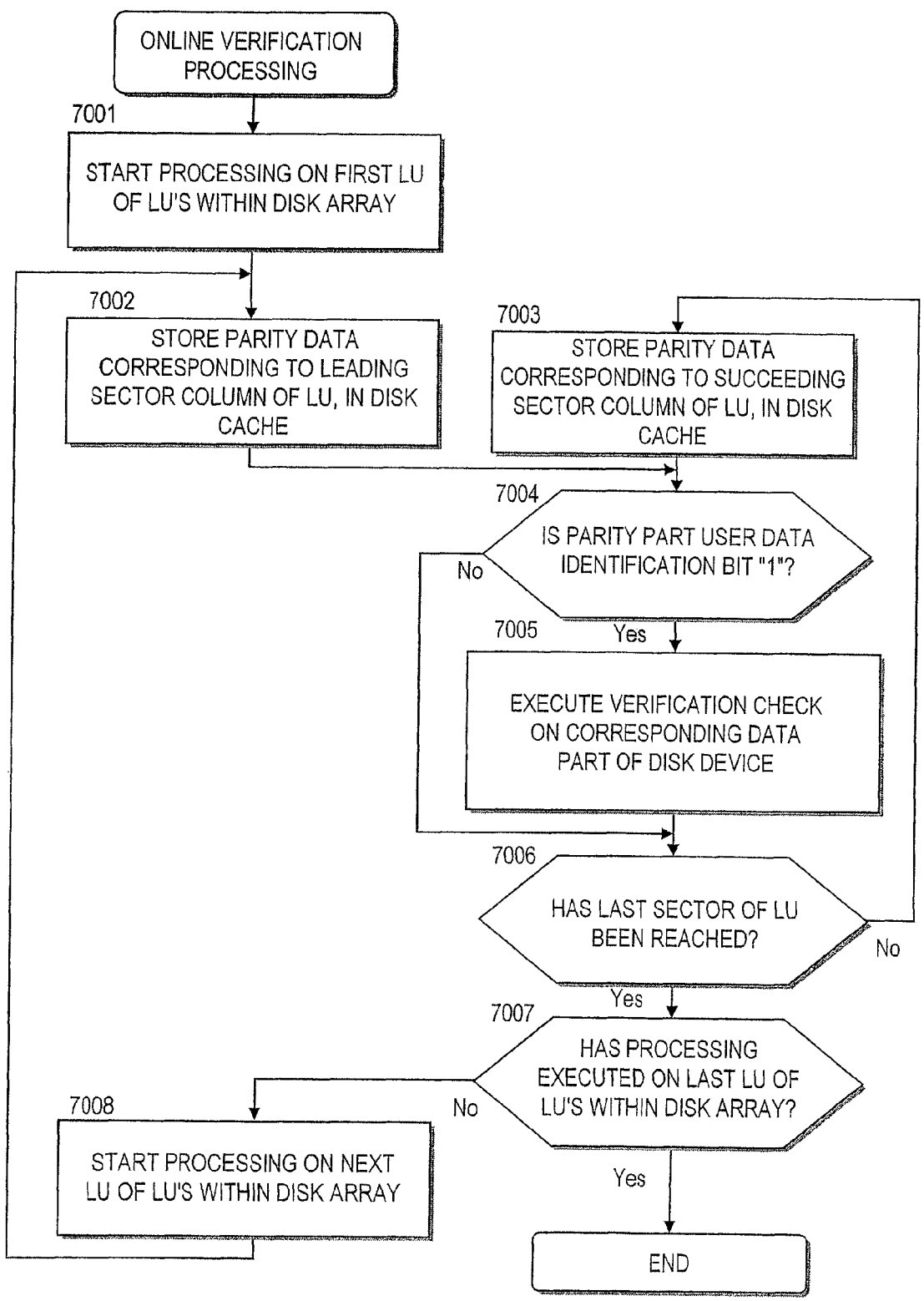
FIG. 13 is a flowchart showing an online verification processing according to the first embodiment of this invention.

FIG. 13 is a flowchart showing an online verification processing according to the first embodiment. The processing is executed by the controller 280 (disk array control program 291).

The processing starts with the following timing as a trigger: when the process loads on the disk array system 200 have a predetermined value or smaller or when the disk array system 200 enters the completely idle state. Alternatively, the processing may be periodically executed.

First, the first LU that is set in the disk device group 270 of the disk array system 200 is selected (step 7001).

Subsequently, the parity data corresponding to the first sector column that has been selected is read out from the disk device and stored in the disk cache 230 (step 7002). It should be noted that when the parity data has already been stored in the disk cache 230, the processing advances to the step 7004 without reading out the parity data from the disk device.

Next, it is judged whether or not the parity part user data identification bit 434 of the parity data is "1" (step 7004).

When the parity part user data identification bit 434 of the parity data is not "1" (when the parity part user data identification bit 434 of the parity data is "0"), no user data is stored in the sector column corresponding to the parity data. Accordingly, the verification check need not be executed on the sector column, so the processing advances to a step 7006 without executing the verification check.

On the other hand, when the parity part user data identification bit 434 is "1", user data is stored in the sector column corresponding to the parity data. Then, the verification check is executed on the sector column (step 7005).

To be specific, the controller 280 issues a "Verify" command for the sector concerned of the disk device with respect to all the data of the sector column. The disk device that has received the "Verify" command executes an internal test for the disk device as to whether or not the data corresponding to the sector is recorded without an error, and notifies the controller 280 of the results. When notified of a sector failure by the disk device, the controller 280 executes the processing of recovery the failure. Specific examples of the processing include a reassign processing of replacing the failed sector, a data recovery processing of recovering data from the rest of the data in the sector column including the failed sector and the corresponding parity data, and recording of the number of failed sectors. It should be noted that as to the parity part, the parity data has successfully been read out in the step 7002, thereby eliminating the necessity of executing the verification check.

In the step 7006, it is judged whether or not the sector column corresponding to the parity data read out in the step 7002 is the last sector column of the selected LU.

When it is judged that the parity data of the last sector of the LU has been read out, all the selected LUs has already been subjected to the verification check, so the processing advances to a step 7007.

On the other hand, when it is judged that the sector from which the parity data has been read out in the step 7002 is not the last sector of the LU, the processing advances to a step 7003.

In the step 7003, the parity data corresponding to the succeeding sector column is read out and stored in the disk cache 230. When the parity data has already been stored in the disk cache 230, the processing advances to the step 7004 without reading out the parity data from the disk device.

In the step 7007, it is judged whether or not the processed LU is the last LU in the disk array system (step 7007). When it is judged that the last LU has been subjected to the processing, the verification check has ended for all the disk devices, so the processing ends. When it is judged that the processed LU is not the last LU, the next LU set in the disk array system 200 is selected, and the processing returns to the step 7002.

The online verification processing described above allows the online verification of an LU in the disk array system. According to this embodiment, the verification check is performed only on the sector including user data, so the time required for the online verification processing can be reduced.

In particular, the presence/absence of the user data in the sector column is checked not based on the user data identification bits 404 of related pieces of data, but based on the parity part user data identification bit 434 of the parity data corresponding to the sector column. Accordingly, the processing time can be reduced with high effectiveness.

It should be noted that the presence/absence of user data is not checked based on the parity part user data identification bit 434, but the presence/absence of user data may be checked based on the user data identification bits 404 of the data of related disk devices.

Further, in the verification check of the step 7005, a sector failure test is similarly performed by reading out the data in the corresponding sector column into the disk cache 230 instead of issuing the "Verify" command to the disk device. In this case, consistency check for a RAID parity can also be performed.

In the disk array system 200 structured as described above according to the first embodiment of this invention, the user data identification bit 404 indicating the presence/absence of user data is set in the expanded data block 400 that is stored in the sector of a RAID area (LU) set in the disk device group. Accordingly, the sector including user data and the sector including no user data can be subjected to processings different from each other.

In particular, the sector including no user data is not subjected to the processings including the correction copy, the intra-system LU copy, the inter-system LU copy, the LU integration, and the online verification. According to this arrangement, it can be reduce the time for the processing executed in the disk array system 200 and also to reduce the processing loads.

In addition, in the case of structuring a data system (RAID) including redundant data, the presence/absence of user data in a sector column is checked based on the parity part user data identification bit 434 of the parity data corresponding to the sector column. Accordingly, the time for the processing executed in the disk array system 200 can be reduced with high effectiveness.

It should be noted that the RAID 5 whose RAID structure has a parity part is used in this invention, but this invention may be applied to RAID 4 or another RAID structure having a parity part may be used, or to another data system including redundant data.

Alternatively, the RAID structure may not have a parity part, or an LU that does not adopt a RAID structure may be used. In the case where the RAID structure is not used, the presence/absence of user data in a sector column cannot be checked based on the parity part user data identification bit 434. However, the presence/absence of user data in a sector column can be checked based on the user data identification bit 404 of related data, which can also reduce the processing time.

Next, description will be made of a second embodiment of this invention.

In the second embodiment, the disk cache 230 has the bitmap 500 as shown in FIG. 9 in which the identification bits 501, instead of the parity part user data identification bits 434 of the parity part, are provided to each sector column so as to correspond to the presence/absence of the user data in the sector column. It should be noted that the system structure is the same as the first embodiment shown in FIG. 1, so its description will be omitted.

As shown above in FIG. 6, when user data is written to the disk device, the parity part user data identification bit 434 of the parity data corresponding to a sector column storing the user data is set to "1" (step 2007). In the equivalent case, the identification bit 501 corresponding to the sector column within the bitmap 500 is set to "1".

The bitmap 500 consists of the same number of identification bits 501 as the number of sector columns. Each identification bit 501 of the bitmap 500 is set to the same value as the parity part user data identification bit 434 of the parity data corresponding to the sector column. Accordingly, by referencing the bitmap 500, it can be reference the parity part user data identification bit 434 of the parity data corresponding to the sector column. As a result, it can be identify whether or not user data is stored in the corresponding sector column merely by referencing the identification bit 501 of the bitmap 500.

The subsequent processings are the same as the first embodiment. As described above, the presence/absence of user data can be identified by use of the bitmap 500 in the processings including the correction copy as shown in FIG. 7, the intra-system LU copy as shown in FIG. 10, and the inter-system LU copy as shown in FIG. 11. In other words, it can be identify the presence/absence of user data in the sector column corresponding to the identification bit 501 by referencing the identification bit 501 of the bitmap 500.

In the disk array system 200 structured as described above according to the second embodiment of this invention, the identification bit 501 indicating the presence/absence of user data is set in the bitmap 500 provided to the disk cache 230, thereby is capable of identifying whether or not user data is present in the sector column. Accordingly, it can be subject respective sector columns to different processings from one another based on the presence/absence of user data.

In particular, instead of performing a processing separately on different sector columns, it can be perform the processing collectively on a continuous area of the bitmap 500 within the disk cache 230, thereby allowing the reduction of the processing time and the processing loads.

It should be noted that the disk cache 230 may have the bitmap 500 in which the identification bits 501 are provided to each stripe column, instead of each sector column, so as to correspond to the presence/absence of the user data. In that case, though the size of a unit to recognize the presence/absence of user data sets as the stripe column size, the size of the bitmap 500 can be reduced. In addition, the processing time can be reduced with high effectiveness.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising:
a plurality of disk drives configured to store data sent from a computer; and
a controller configured to control input/output of the data, wherein the controller appends data identification information to each of a plurality of logical data blocks corresponding to each of a plurality of a sectors that are physical storage regions in the plurality of the disk drives,
wherein the data identification information indicates whether the data sent from the computer is stored in each of the plurality of blocks, and
wherein the controller creates a parity logical data block P0, based on the plurality of logical data blocks, and creates parity part data identification information which indicates whether the data is stored in at least one sector in the plurality of sectors and appends the parity part data identification information to the parity logical data block,
wherein, if the controller receives a format request, the controller stores unique data in at least one block of the plurality of logical data blocks, appends a guarantee code including a logical address and a longitudinal redundancy check to the at least one block, and configures the data identification information and the parity part data identification information to indicate that stored data is not sent from the computer,
wherein the controller checks the parity part identification information, and
wherein the controller determines whether to perform a storage function to the plurality of the logical data blocks by referring to a result of a check of the parity part data identification information.

2. A storage system according to claim 1, wherein the parity logical data block is exclusive OR of the plurality of the logical data blocks.

3. A storage system according to claim 1, further comprising;
a spare disk,
wherein the storage function is a correction copy, and
wherein, if the parity part data identification information indicates that data sent from the computer is stored in at least one logical data block in the plurality of the logical data blocks, the controller recovers an error logical data block in the plurality of the logical data blocks by utilizing logical data blocks within non-failing sectors of a sector column corresponding to parity data in the plurality of the logical data blocks and the parity logical data block, and stores the recovered error logical data block to the spare disk.

4. A storage system according to claim 3, wherein, if the parity part data identification information indicates that data sent from the computer is not stored in at least one logical data block in the plurality of the logical data blocks, the controller writes RAID format data for a RAID area to the spare disk.

5. A storage system according to claim 1, wherein at least some of the disk drives forms a plurality of logical units including a first logical unit and a second logical unit,
wherein a plurality of the logical data blocks and the parity logical data block are stored in the first logical unit,
wherein the storage function is migration from the first logical unit to the second logical unit, and
wherein, if the parity part data identification information indicates a predetermined state, the controller migrates all of the data stored in a sector column.

6. A storage system according to claim 1, wherein a plurality of the disk drives forms a first logical unit storing the plurality of the logical data blocks and the parity logical data block, wherein the storage function is migration from the first logical unit to a second logical unit which is provided by another storage system coupled to the storage system, and wherein, if the parity part data identification information indicates a predetermined state, the controller migrates all of the data stored in a sector column.

7. A storage system according to claim 6, wherein, if the parity part data identification information indicates that data sent from the computer is not stored in the at least one logical data block in the plurality of the logical data blocks, the controller does not perform the migration.

8. A storage system according to claim 1, wherein a plurality of the disk drives forms a plurality of logical units including a first logical unit and a second logical unit, wherein a plurality of the logical data blocks and the parity logical data block are stored in the first logical unit, wherein the storage function is logical unit integration, and wherein, if the parity part data-identification information indicates a predetermined state, the controller checks the first and second logical units to ensure that data identification bits for all parity data indicate "0" before integration processing is performed.

9. A storage system according to claim 1, further comprising:

a cache memory temporarily storing data sent form the computer;

wherein the controller creates a bit map of identification bits, and wherein the controller determines whether to perform a storage function to a plurality of the logical data blocks by referring to a result of the check of the bit map.

10. A storage system comprising:

a plurality of disk drives configured to store data sent from a computer; and a controller configured to control input/output of the data, wherein the controller appends first information to each of a plurality of logical data blocks corresponding to each of a plurality of a sectors that are physical storage regions in the plurality of the disk drives, the first information indicating whether each of the plurality of the logical blocks is a part of the data sent from the computer, and wherein the controller creates a parity logical data block, based on the plurality of logical data blocks, and creates second information which indicates whether data is stored in at least one sector in the plurality of the sectors and appends the second information to the parity logical data block, wherein, if the controller receives a format request, the controller stores unique data in at least one block of the plurality of logical data blocks, appends a guarantee code including a logical address and a longitudinal redundancy check to the at least one block, and configures the first information and the second information to indicate that stored data is not sent from the computer, wherein the controller checks the second information, and wherein the controller determines whether to perform a storage function to the plurality of the logical data blocks by referring to a result of a check of the second information.

11. A storage system comprising:

a plurality of disk drives configured to store data sent from a computer; and a controller configured to control input/output of the data, wherein the controller appends data identification information to each of a plurality of logical data blocks corresponding to each of a plurality of a sectors that are physical storage regions in the plurality of the disk drives, wherein the data identification information indicates whether the data sent from the computer is stored in each of the plurality of blocks, and wherein the controller creates a parity logical data block P0, based on the plurality of logical data blocks, wherein, if the controller receives a format request, the controller stores unique data in at least one block of the plurality of logical data blocks, appends a guarantee code including a logical address and a longitudinal redundancy check to the at least one block, and configures the data identification information to indicate that stored data is not sent from the computer, wherein the controller checks the data identification information of predetermined related one of said disk drives, and wherein the controller determines whether to perform a storage function to the plurality of the logical data blocks by referring to a result of a check of the data identification information of the predetermined related ones of said disk drives.

* * * * *